350-371 SR

XR 3,659,270

7 X4039W X4025W

United States Patent

Maldonado et al.

[15] 3,659,270

[45] Apr. 25, 1972

[54] STRAIN-BIASED FINE GRAIN FERROELECTRIC CERAMIC DEVICES FOR OPTICAL IMAGE STORAGE AND DISPLAY SYSTEMS

[72] Inventors: Juan Ramon Maldonado, North Plainfield; Allen Henry Meitzler, Morristown, both of N.J.

[73] Assignee: Bell Telephone Laboratories, Incorporated, Murray Hill, N.J.

[22] Filed: Jan. 5, 1970

[21] Appl. No.: 672

[52] U.S. Cl. ....................340/173.2, 178/6.6 R, 178/7.3 D, 340/173 LM, 350/149

[51] Int. Cl. ....................G11c 5/04, G11c 11/22, G11c 11/42

[58] Field of Search ....................340/173.2, 173 LM; 350/149; 333/30; 178/6.6 R, 7.3 D

[56] References Cited

UNITED STATES PATENTS 3,435,425 3/1969 Hastings ....................340/173.2
3,531,182 9/1970 Land ....................350/150
3,362,019 1/1968 Gratian ....................340/173.2
3,417,381 12/1968 Sincerbox ....................340/173 LM

OTHER PUBLICATIONS

Aizu, Japanese Discover New Optoelectronic Properties, Electronic Engineering, 6/69, p. 6.
Daremus, Charge Release of Several Ceramic Ferroelectrics Under Various Temperature and Stress Conditions, Proceedings of the IRE, May, 1959, pp. 921–924.

*Primary Examiner*—Bernard Konick
*Assistant Examiner*—Stuart Hecker
*Attorney*—R. J. Guenther and Arthur J. Torsiglieri

[57] ABSTRACT

A fine grain, ferroelectric ceramic parallel plate, such as lanthanum doped, lead zirconate-lead titanate, is subjected to a constant and uniform stress along a first direction in the plane of the plate. By means of a photoconductive layer and a pair of transparent electrode layers, the ferroelectric plate under stress can be subjected to selective WRITE-IN of a pattern of information using an optical WRITE-IN beam of light, as well as a selective ERASE of such information, all under the control of electric fields only in the normal direction to the plane of the ferroelectric plate produced by D.C. voltages applied to the electrode layers.

10 Claims, 7 Drawing Figures

3659270

("PRESET")

INVENTORS
J. R. MALDONADO
A. H. MEITZLER

BY DCaple ("WRITE IN")

"READOUT"

("PRESELECTED ERASE")

("READOUT")

STRAIN-BIASED FINE GRAIN FERROELECTRIC CERAMIC DEVICES FOR OPTICAL IMAGE STORAGE AND DISPLAY SYSTEMS

Field of the Invention

This invention relates to the field of optical memory systems, in particular to those involving ferroelectric devices.

BACKGROUND OF THE INVENTION

In our pending joint patent application with D. B. Fraser, Ser. No. 889,087, filed Dec. 30, 1969 now U.S. Pat. No. 3,609,002, optical image storage and display devices are described which utilize the advantageous ferroelectric polarization switching properties of certain polycrystalline ferroelectrics, especially a ceramic composed of fine grain, lanthanum doped, lead zirconate-lead titanate manufactured by a hot-pressing process. By "fine grain" is meant such a polycrystalline ceramic composed of grains about 2 microns in diameter or less. In general, a "fine grain" ceramic is one in which the grain size is sufficiently small so that the ceramic does not depolarize forward scattered light traversing therethrough. However, those devices utilize the application of electric fields in two different directions, (at right angles to one another) which requires rather costly electrode and control switching configurations.

SUMMARY OF THE INVENTION

This invention provides an optical image storage and display device in which the active element is a strain-biased electrooptic ferroelectric ceramic parallel plate, such as a fine grain, lanthanum doped, lead zirconate-lead titanate ceramic. The strain-biasing is preferably provided by a constant in time and spatially uniform tensile or compressive stress in the plane of the ceramic plate. Thereby, a state of birefringence is induced in the plate with respect to the components of optical radiation incident normally upon the plate.

Advantageously, the plate is initially operated upon ("-PRESET") by means of a first electric field applied in a direction normal to the plate, the plate being in the strain-biased condition. This puts the whole plate in a PRESET state of birefringence. Then, while still in the strain-biased condition, the plate is subjected to a "WRITE IN" of information by means of a second electric field applied to selected portions of the plate in the direction opposite to that of the first electric field. Advantageously, the second electric field has a magnitude in the range of between about one-half and one-quarter of the first electric field. Thereby, the selected portions of the plate now are in the WRITE-IN state characterized by a state of birefringence which is different from the state of birefringence persisting in the nonselected portions of the plate (which are still in the PRESET state). Thus, a geometrical pattern of two different states of birefringence is impressed in the ferroelectric plate. READOUT of this pattern of information contained in the ferroelectric plate is accomplished by subjecting the plate to a "readout" beam of light in conjunction with an optical polarizer and an optical analyzer, in order to convert the birefringence pattern of information in the plate into optical intensity information in the form of relatively bright and dark portions over the cross section of the "readout" beam of light.

In a particular embodiment of this invention, an optical image and display device is built as follows. A layer of electrically conducting, semitransparent indium oxide is sputtered onto a first major surface of the ferroelectric ceramic plate, thereby adhering thereto. A transparent epoxy cement is then used to bond the layer of indium oxide (and hence the ceramic plate indirectly) to a major surface of a relatively thick, transparent, elastic member, such as a slab of Plexiglas. A second major surface of the ferroelectric is dip-coated with a photoconductive layer such as polyvinyl carbazole, or is coated by a sputtering deposition technique with a film of cadmium sulphide. Then, this photoconductive layer is coated with a semitransparent, electrically conducting layer of gold, typically about 100 or 200 angstroms thick. Thus, a multilayered structure is formed containing the ferroelectric plate sandwiched in the middle thereof. The Plexiglas slab is then subjected to a bending moment which stretches the major surface of the Plexiglas in contact with the epoxy. Thereby, the ferroelectric plate is subjected to a corresponding tensile stress which produces a constant and uniform tensile strain, typically of the order to $10^{-3}$, along the plane of the ferroelectric plate. Thus, the ferroelectric plate is now strain-biased.

The first and second electric fields mentioned above can be applied to the ferroelectric plate in the sandwich by means of a D.C. source connected across the indium oxide and the gold layers. By proper selection of thickness of the photoconductive layer, only if and where this layer is illuminated by optical radiation will there be produced any significant applied electric fields in the ferroelectric plate, corresponding to the first and second electric fields. Thereby, the ferroelectric plate can easily be subjected to PRESET, WRITE-IN, and READOUT operations.

BRIEF DESCRIPTION OF THE DRAWING

This invention, together with its features, advantages, and objects may be better understood from a reading of the following detailed description in conjunction with the drawings in which.

DETAILED DESCRIPTION

Figure 1:
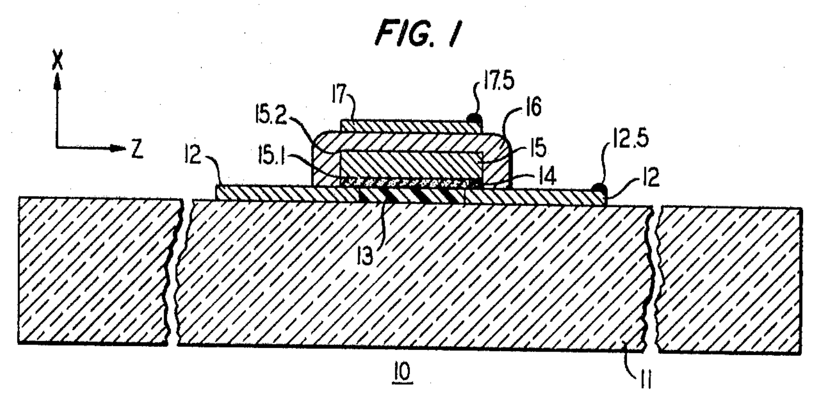
FIG. 1 is a cross-section view of an optical image storage and display device, according to a specific embodiment of the invention.

FIG. 1 illustrates a cross section of an optical image storage and display device 10, according to a specific embodiment of the invention. A transparent elastic member 11, typically of Plexiglas, serves as a substrate for the vapor deposition of an opaque metal layer 12. In accordance with the spatial directions indicated in FIG. 1, typically the Plexiglas member 11 is about 2 inches long in the *y* direction, about 1 inch wide in the *z* direction, and about one-eighth of an inch thick in the *x* direction, *x*, *y*, and *z* being mutually orthogonal directions. The metal layer 12 typically is a layer of gold about 5,000 A thick, deposited upon a layer of chromium about 100 A thick for adhesion to the Plexiglas member 11 of the metal layer 12. At the center of the metal layer 12 is a rectangularly shaped aperture filled with a transparent epoxy cement 13. At an extremity of the metal layer 12 is located a terminal 12.5 for external electrical connection. A ferroelectric parallel plate 15 is advantageously supplied by a fine grain hot pressed ferroelectric ceramic composed of 65 percent lead zirconate-35 percent lead titanate (by weight) doped with 2 percent (atomic) lanthanum added as lanthanum oxide, as manufactured by Clevite Corp. for example. Upon a first major surface 15.1 of this ferroelectric plate 15 is sputtered a layer 14 of semitransparent, electrically-conducting indium oxide, which is cemented by the epoxy 13 securely with respect to the Plexiglas member 11.

Typically, the plate 15 is about 200 mils square in the *yz* plane and about 75 microns thick in the *x* direction. It is important that the indium oxide layer 14 overlap the epoxy 13 in order that this indium oxide layer 14 make good electrical contact with the metal layer 12. A second major surface 15.2 of the ferroelectric plate 15, parallel to the first major surface 15.1, is coated with a photoconductive layer 16, typically a dip-coated layer of polyvinyl carbazole about 5 microns thick. Alternatively, sputtered photoconductive cadmium sulphide, or other suitable photoconductive layer can be used for the layer 16. A semitransparent electrically conducting layer of gold 17, typically having a thickness corresponding to a surface resistivity of 20 ohms per square, is vapor deposited upon the photoconductive layer 16 and is provided with a terminal 17.5 for external electrical connection.

When a voltage in the range of about 100 to 300 volts is applied across the terminals 12.5 and 17.5, an electric field is produced in the ferroelectric plate 15 in the normal $x$ direction. However, this electric field is insignificant unless a beam of optical radiation is simultaneously incident upon the photoconductive layer 16 with an intensity and wavelength distribution which is sufficient to render the photoconductive layer 16 electrically conducting. Thus, only in the presence of such a beam of optical radiation will the voltage supplied to the terminals 12.5 and 17.5 be sufficient to subject the plate to significant electric fields, that is, sufficient to switch the remanent polarization of the plate 15. This will become clearer from the further description below. It should be understood, however, that the purpose of the photoconductive layer 16 is to facilitate the geometrically selective application of normal electric fields to the plate 15, and that other methods can also be used to apply normal electric fields to the plate 15.

Figure 2:
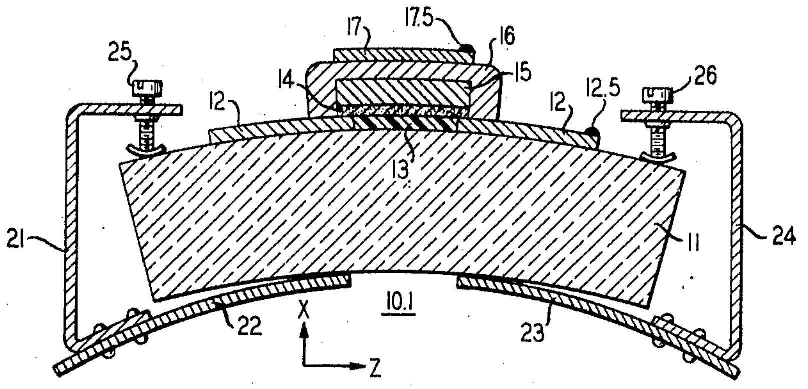
FIG. 2 is a schematic pictorial diagram showing the device illustrated in FIG. 1 subjected to a tensile stress, in accordance with a specific feature of this invention.

The device 10, in accordance with the invention, is subjected to and maintained under a tensile stress, thereby inducing a strain-biased condition in the ferroelectric ceramic plate 15, as illustrated in FIG. 2 for example. The device 10 in this strain-biased state is indicated by the reference numeral 10.1 in FIGS. 2–7. The metal holders 21–24 in conjunction with setscrews 25 and 26, as illustrated in FIG. 2, produce a bending moment in the $y$ direction in the transparent elastic member 11. Bending of the member 11 produces a spatially uniform tensile strain in the ferroelectric plate 15, typically of the order of $10^{-3}$. Thereby, the plate 15 is put in a state of birefringence with respect to optical radiation propagating along the normal $x$ direction. In all further operations to be described, the device 10 is maintained in this same strain-biased condition, therefore the numeral 10.1 will be used in referring thereto in all further operations to be performed therewith.

Figure 3:
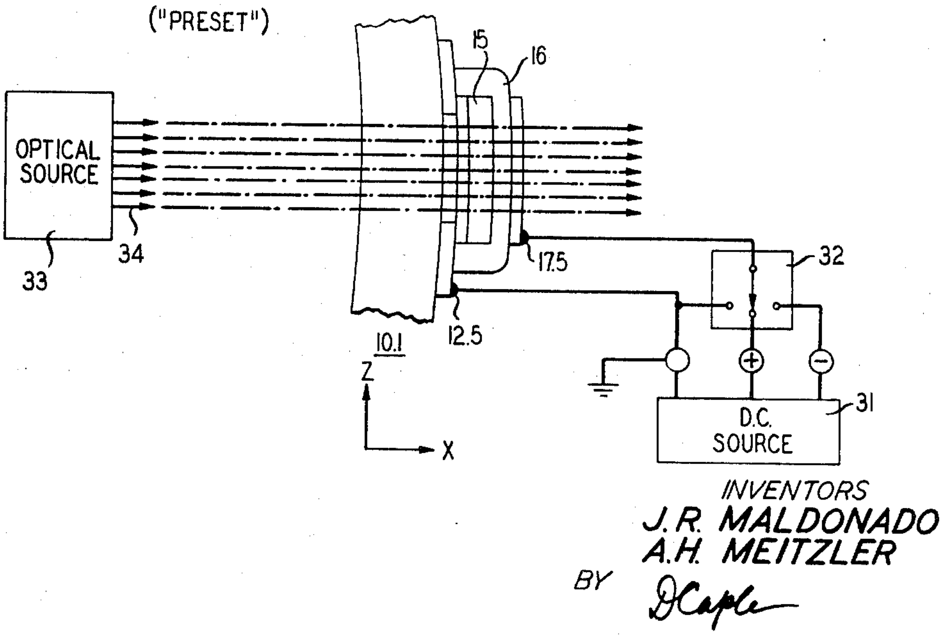
FIG. 3–7 are schematic diagrams showing the device illustrated in FIG. 2 successively undergoing PRESET, WRITE-IN, READOUT, PRESELECTED ERASE, and READOUT processes, showing the use of the specific embodiment of this invention illustrated in FIG. 1.

In order to have a reproducible optical image storage and display, the device 10.1 is subjected to a PRESET operation, indicated schematically in FIG. 3. The terminal 17.5 of the device 10.1 is electrically connected to a D.C. voltage supply 31 through a single pole, triple throw switch 32. The switch 32 is set in a position corresponding to an applied positive voltage, about 220 volts, of the D.C. source 31 to the terminal 17.5. The terminal 12.5 is grounded, and the device 10.1 is simultaneously illuminated by a beam of light 34 supplied by the optical source 33. The intensity of this beam of light is uniform across its cross section, and floods the entire working portion of the plate 15 in the device 10.1 (in the region underneath the epoxy 13) with a white light flux of about 2 milliwatts/cm$^2$. This renders the photoconductive layer 16 electrically conductive over its entire working cross section. Thereby, substantially, the full 220 volts of D.C. voltage supply 31 is applied across the entire working cross section of the plate 15, the portion of the photoconductive layer 16 in opposition thereto being rendered electrically conductive by the beam 34.

As is well known, there is ordinarily some time delay in the response of the photoconductive layer 16 to the beam 34; therefore, advantageously the voltage from the source 31 is applied to the terminals 17.5 and 12.5 in the presence of the beam 34 for at least a time period equal to this time delay. In this manner, the entire working cross section of the ferroelectric plate 15 is subjected to a first electric field in the direction perpendicular to the plane of the plate 15. Moreover, the entire working cross section of the ferroelectric plate is now in a state of birefringence corresponding to the PRESET condition. In general, this state of birefringence is different from the state of birefringence in the plate at the time previous to the PRESET operation.

Figure 4:
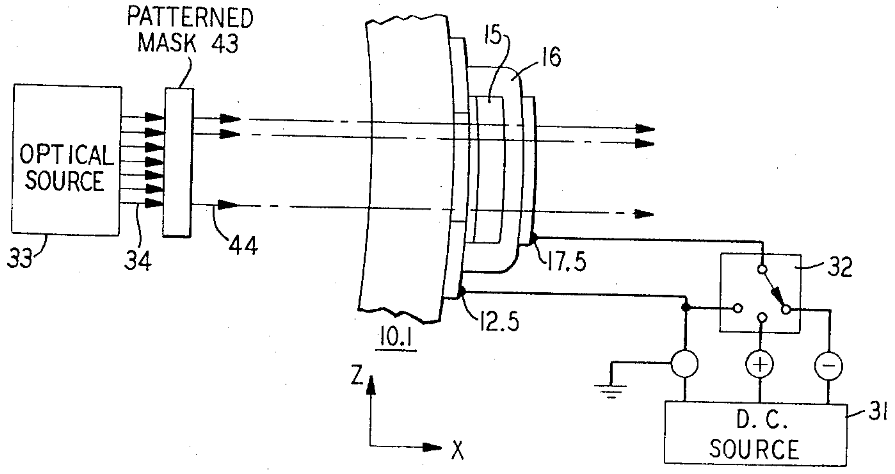

WRITE-IN of a pattern of information into the ferroelectric plate 15 is achieved in an arrangement indicated schematically in FIG. 4. In the WRITE-IN operation, the switch 32 is positioned so that the negative terminal of the D.C. supply 31 (typically about 80 volts) is connected to terminal 17.5, while the terminal 12.5 is grounded. A patterned mask 43, consisting of relatively transparent and opaque portions, is located between the optical source 33 of the beam of light 34 and the device 10.1 (still under tensile strain). In this way, a corresponding pattern of optical radiation in a beam of light 44 is incident upon the device 10.1, and upon the photoconductive layer 16 in particular. Thereby, the photoconductive layer 16 is rendered electrically conducting only at certain portions thereof, corresponding to the pattern of optical radiation in the beam of light 44. Simultaneously, the ferroelectric plate is subjected to a second electric field, corresponding to the 80 volts from the D.C. supply, in the opposite direction from that of the first electric field, but only at certain portions thereof in accordance with the pattern of transparencies in the mask 43. As a result, the ferroelectric plate 15 now contains portions (in accordance with these transparencies) which are in the state of birefringence corresponding to the WRITE-IN condition; whereas the remaining portions (in accordance with opacities in the mask 44) are still in the state of birefringence corresponding to PRESET condition.

Figure 5:
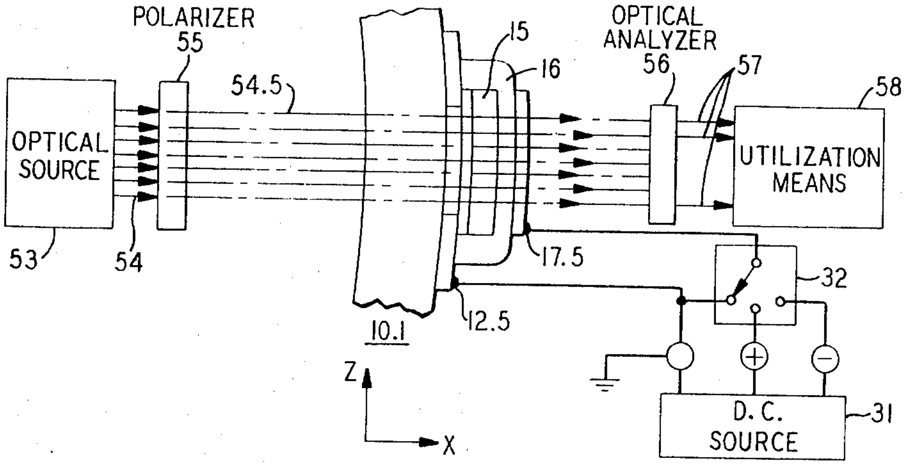

These states of birefringence (corresponding to WRITE-IN and PRESET) are different; and this property can be utilized for the READOUT operation, as indicated schematically in FIG. 5. The terminals 12.5 and 17.5 are now both grounded by means of the switch 32. Upon the device 10.1 (still subjected to the strain) is incident the beam of linearly polarized light 54.5 from the optical source 53 (which can, but need not, be the same as the source 33 used in the PRESET operation illustrated in FIG. 3). Advantageously, an optical polarizer 55 is located between the optical source 33 and the device 10.1, and is oriented to linearly polarize the beam of light 34 at an angle of 45° with respect to the $z$ axis in the $yz$ plane. The polarized beam of light 54.5 passes through the ferroelectric plate 15, which has been previously subjected to the above-described PRESET and WRITE-IN operations. An optical analyzer 56 is oriented advantageously with its axis ("crossed") at right angles to the polarizer 55. Due to the two different states of birefringence in the plate 15, the exit beam of light 57 is impressed with a pattern of intensity across its cross section corresponding to the pattern in the mask 43. Advantageously, the color of the light furnished by the optical source 53 is selected to be monochromatic, with a wavelength such that the ordinary and extraordinary rays in the beam 54.5 suffer a relative phase retardation of 180° (one-half wavelength) in those portions of the plate 15 which have been subjected to the WRITE-IN operation; thereby the exit beam of light 57 will have maximum contrast, that is, maximum intensity at those portions of its cross section corresponding to WRITE-IN (i.e., transparencies of the mask 43) and minimum intensity elsewhere. This is due to the well-known fact that a 180° phase shift between ordinary and extraordinary rays (of equal amplitudes) produces a 90° spatial rotation of the direction of polarization. Thereby, the remaining portions of the exit beam 57 will appear darker, and may even be extinguished completely by proper choice of the thickness of the plate 15, in view of well-known optical principles. Typically, for an optical source 53 of about 6,000 A, a thickness of about 70 microns of the plate 15 is useful. The exit beam 57 is collected by utilization means 58 for detecting and using the information in this exit beam 57.

The polarizer 55 and analyzer 56 can alternatively be oriented with their optic axes parallel to each other in order to obtain a negative rather than a positive image during READOUT, in this case where WRITE-IN corresponds to the 180° relative phase retardation.

As another alternative, the color of the optical source 53 used in the READOUT operation can be selected such that the "PRESET" condition corresponds to the 180° phase retardation. In this case, for a positive image display in the exit beam 57, the axes of the polarizer 55 and the analyzer 56 are oriented parallel to each other. In any event, it should now be obvious to the skilled worker that many other orientations of the polarizer 55 and analyzer 57 are useful for the READOUT operation in conjunction with different optical sources of the beam of polarized light 54.5.

An optical image storage and display device is thus furnished by the device 10.1 when subjected to the above-described various PRESET, WRITE-IN, and READOUT operations. Maximum sharpness of contrast in the image READOUT is provided when the device 10.1 is maintained in the strain-biased condition at all times subsequent to the PRESET operation.

Figure 6:
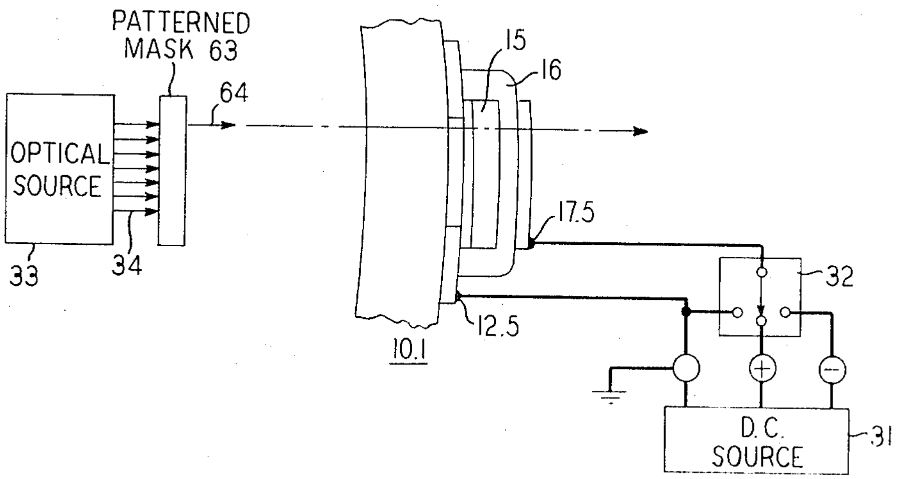

Subsequent to the WRITE-IN and/or READOUT operations, the device 10.1 can be subjected to a PRESELECTED ERASE operation, as indicated schematically in FIG. 6. This operation erases preselected portions of the plate 15 previously in the WRITE-IN condition and restores these portions to the PRESET condition. The ERASE operation may, if desired, restore the whole operating portion of the plate 15 to the PRESET condition. Any portion of the ferroelectric plate 15 already in the PRESET condition will not be affected by the ERASE operation.

In the PRESELECTED ERASE operation, as indicated in FIG. 6, the terminal 17.5 of the device 10.1 is connected through the switch 32 to the positive terminal of the D.C. source 31, just as in the PRESET operation illustrated in FIG. 3. However, a second patterned mask 63, in general different from the patterned mask 43 used for the WRITE-IN operation, is located in the path of the beam of light 34. Thereby, a preselected erasing beam of light 64 is formed which is incident upon the ferroelectric plate 15 in the device 10.1. This beam of light 64 renders electrically conducting the thus illuminated, preselected portions of the photoconductive layer 16. Thereby, the first electric field is now applied only to the corresponding preselected portions of the ferroelectric plate 15. Thus, the ferroelectric plate 15 is subjected to a PRESELECTED ERASE operation which returns the preselected, illuminated portions of the plate 15 back into the PRESET condition.

Figure 7:
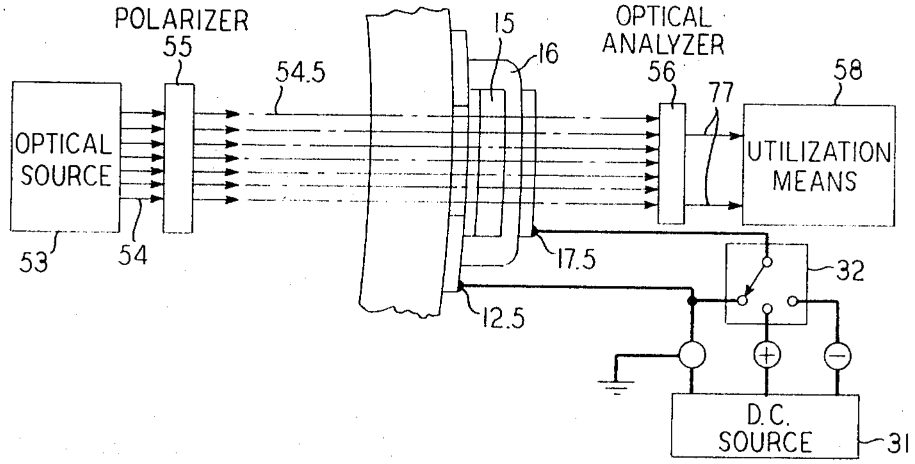

When the plate 15 is thereafter subjected to the subsequent READOUT operation, as illustrated in FIG. 7, the exit beam 77 will be influenced by the PRESELECTED ERASE operation. In particular, those portions of the plate 15 which are subjected to the PRESELECTED ERASE operation will affect the polarization of the beam 54.5 in the same way as those portions not subjected to the WRITE-IN operation. This fact is evidenced by the missing top arrow in the exit beam 77 as compared with the exit beam 57.

While the invention has been described in terms of a particular fine grain ferroelectric ceramic material in the plate 15, various other fine grain ferroelectric materials can be used, as they become available in the art. For example, lead doped or bismuth doped lead zirconate-lead titanate ceramics can also be used as the ferroelectric element instead of the lanthanum doped ceramic described in detail above. Other rare earth doped, lead zirconate-lead titanate, fine grain ceramics, as well as other types of fine grain ceramics having similar desired ferroelectric birefringent properties, can be used as they become available in the art.

Instead of the patterned mask 43, the WRITE-IN operation may also be accomplished by a single scanning beam which is modulated in time according to the desired pattern. It should also be understood that the photoconductive material may be disposed on both opposing sides of the ferroelectric plate 15 in the form of a pair of layers, instead of the single photoconductive layer 16 on the single side opposite from the epoxy 13. In such a case, a semitransparent layer of gold or other suitable electrical material is preferred, instead of indium oxide for the layer 14. Finally, the polarizer 55 and the analyzer 56 can be present in all the operations of PRESET, WRITE-IN, READOUT, and ERASE, and can therefore be incorporated permanently in the device 10.1 itself, in the form of a pair of polarizing layers disposed on opposite sides of this device.

What is claimed is:

1. An optical image storage and display device which comprises:
   a. a fine grain ferroelectric ceramic plate;
   b. a layer of photoconductive material disposed on at least one major surface of the plate;
   c. a pair of at least semitransparent electrically conducting layers located on opposite sides of the plate, each of these layers provided with a terminal for connection to a source of electrical voltage,
   d. means for applying a stress to the plate in order to induce therein a strain in a direction parallel to the major surface of the plate, whereby a first state of birefringence is induced in the plate in response to a first voltage applied to a first one of said terminals in the presence of optical radiation incident upon the photoconductive layer and whereby a second state of birefringence is induced in portions of the plate in response to a second voltage, of opposite polarity from the first voltage, applied to the said first one of said terminals in the presence of optical radiation incident upon corresponding portions of the photoconductive layer; and
   e. a transparent elastic member to which one of the semitransparent electrically conducting layers is bonded by means of a transparent cement.

2. The device recited in claim 1 in which the transparent elastic member has a thickness at least an order of magnitude greater than that of ferroelectric plate and in which the elastic member is subjected to a bending moment.

3. The method of optical image storage which comprises the steps of:
   a. subjecting a fine grain ferroelectric ceramic plate to a tensile strain, said strain being spacially uniform and constant in time, in order to put the plate in a strain-biased condition;
   b. subjecting the plate to a first electric field normal to the plane of the plate in a first direction sufficient to induce a first state of birefringence in the plate;
   c. subjecting the plate to a second electric field normal to the plane of the plate in the direction opposite from the first direction at selected portions of the plate sufficient to induce a second state of birefringence at the selected portions; and
   d. locating the plate in the path of a beam of polarized light.

4. The method recited in claim 3 in which the fine grain ferroelectric ceramic plate is essentially lead zirconate-lead titanate.

5. The method recited in claim 4 in which the plate is essentially lanthanum doped lead zirconate-lead titanate.

6. An optical image storage and display device which comprises:
   a. a fine grain ferroelectric ceramic plate;
   b. a layer of photoconductive material disposed on at least one major surface of the plate;
   c. a pair of at least semitransparent electrically conducting layers located on opposite sides of the plate, each of these layers provided with a terminal for connection to a source of electrical voltage; and
   d. means for applying a stress to the plate in order to induce therein a strain in a direction parallel to the major surface of the plate, said strain being spacially uniform and constant in time, whereby a first state of birefringence is induced in the plate in response to a first voltage applied to a first one of said terminals in the presence of optical radiation incident upon the photoconductive layer and whereby a second state of birefringence is induced in portions of the plate in response to a second voltage, of opposite polarity from the first voltage, applied to the said first one of said terminals in the presence of optical radiation incident upon corresponding portions of the photoconductive layer.

7. The device recited in claim 6 which further includes a polarizer layer located on at least one side of the ferroelectric plate.

8. The device recited in claim 6 in which the strain is a tensile strain.

9. The device recited in claim 6 in which the ferroelectric ceramic plate is fine grain lead zirconate-lead titanate.

10. The device in claim 9 in which the plate is doped with lanthanum.

* * * * *